US008165410B2

(12) United States Patent  (10) Patent No.: US 8,165,410 B2
Perronnin  (45) Date of Patent: Apr. 24, 2012

(54) BAGS OF VISUAL CONTEXT-DEPENDENT WORDS FOR GENERIC VISUAL CATEGORIZATION

(75) Inventor: Florent Perronnin, Domene (FR)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/971,087

(22) Filed: Dec. 17, 2010

(65) Prior Publication Data

US 2011/0091105 A1   Apr. 21, 2011

Related U.S. Application Data

(63) Continuation of application No. 11/524,100, filed on Sep. 19, 2006, now Pat. No. 7,885,466.

(51) Int. Cl.
*G06K 9/62* (2006.01)
(52) U.S. Cl. .......................................... 382/224
(58) Field of Classification Search ........... 382/181–231
See application file for complete search history.

(56) References Cited

U.S. PATENT DOCUMENTS

| | | | |
|---|---|---|---|
| 6,108,444 | A | 8/2000 | Syeda-Mahmood |
| 6,621,930 | B1 | 9/2003 | Smadja |
| 2004/0205542 | A1 | 10/2004 | Bargeron et al. |
| 2007/0005356 | A1 | 1/2007 | Perronnin |
| 2007/0258648 | A1 | 11/2007 | Perronnin |

OTHER PUBLICATIONS

Matsuo titled: "Keyword Extraction from a Single Document using Co-Occurrence Statistical Information" 2003.*
Wang titled: "Content-Based Image Annotation Refinement" published 2007.*
Escalante titled: "Improving Automatic Image Annotation Based on Word Co-Occurrence" 2008.*
Galleguillos titled: "Object Categorization using Co-occurrence, Location and Appearance" 2008.*
Fan titled: "Automatic Image Annotation by Using Concept-Sensitive Salient Objects for Image Content Representation." 2004.*
Savarese et al., "Discriminative Object Class Models of Appearance and Shape by Correlatons," Proc. of the IEEE CVPR 2006.
Agarwal et al., "Hyperfeatures-Multilevel Local Coding for Visual Recognition," Proc. of IEEE ECCV 2006.
Hofmann, "Unsupervised Learning by Probabilistic Latent Semantic Analysis," Machine Learning, 42, pp. 177-196, 2001.
P. Duygulu, "Object Recognition as Machine Translation: Learning a Lexicon for a Fixed Image Vocabulary," published 2002.
Antonia Torralba, "Context-Based vision system for place and object recognition," published 2003.

\* cited by examiner

*Primary Examiner* — Alex Liew
(74) *Attorney, Agent, or Firm* — Fay Sharpe LLP

(57) ABSTRACT

Category context models (64) and a universal context model (62) are generated including sums of soft co-occurrences of pairs of visual words in geometric proximity to each other in training images (50) assigned to each category and assigned to all categories, respectively. Context information (76) about an image to be classified (70) are generated including sums of soft co-occurrences of pairs of visual words in geometric proximity to each other in the image to be classified. For each category (82), a comparison is made of (i) closeness of the context information about the image to be classified with the corresponding category context model and (ii) closeness of the context information about the image to be classified with the universal context model. An image category (92) is assigned to the image to be classified being based on the comparisons.

15 Claims, 4 Drawing Sheets

BAGS OF VISUAL CONTEXT-DEPENDENT WORDS FOR GENERIC VISUAL CATEGORIZATION

This application is a continuation of prior application Ser. No. 11/524,100 filed Sep. 19, 2006, which has since issued on Feb. 8, 2011 as U.S. Pat. No. 7,885,466. The prior application Ser. No. 11/524,100 filed Sep. 19, 2006 is incorporated herein by reference in its entirety.

BACKGROUND

The following relates to the image storage and processing arts. It is described with example reference to classifying images based on the imaged subject matter or class, and is described with particular reference thereto. However, the following will find more general application in image classification, image content analysis, image archiving, image database management and searching, and so forth.

Widespread availability of digital cameras and other direct-digital imagers, and of optical scanners that convert film images, paper-printed images, or so forth into digital format, has led to generation of large numbers of digital images. Accordingly, there is interest in developing techniques for classifying images based on content, so as to facilitate image searches, image archiving, and like applications.

One approach that has been used is the "bag-of-words" concept derived from text document classification schemes. In text document bag-of-words classification schemes, clustering techniques are applied to group documents based on similarity in word usage. Such clustering techniques group together documents that share similar vocabularies as measured by word frequencies, word probabilities, or the like.

Extension of bag-of-words approaches to image classification requires an analog to the word vocabulary. In some approaches, a visual vocabulary is obtained by clustering low-level features extracted from training images, using for instance K-means. In other approaches, a probabilistic framework is employed, and it is assumed that there exists an underlying generative model such as a Gaussian Mixture Model (GMM). In this case, the visual vocabulary is estimated using the Expectation-Maximization (EM) algorithm. In either case, each word corresponds to a grouping of typical low-level features. It is hoped that each visual word corresponds to a mid-level image feature such as a type of object (e.g., ball or sphere, rod or shaft, or so forth), characteristic background (e.g., starlit sky, blue sky, grass field, or so forth).

Existing bag-of-words image classification schemes typically do not account for context of the visual words. For example, the visual word corresponding to a generally round sphere may be recognized, but its context is not recognized (e.g., whether it is in a blue sky suggestive that the sphere is the sun, or in a grass field suggestive that the sphere is a game ball, or so forth). Moreover, while it is hoped that each visual word corresponds to a mid-level feature, it may in fact correspond to a lower level feature (e.g., a word may correspond to a curved edge of particular orientation, rather than to an object such as a sphere). Again, recognition of context would be useful in making use of visual "words" that correspond to lower level features (e.g., words corresponding to several different curved edges, taken together by accounting for context, may be recognized as an assemblage representing a sphere).

Existing context-based visual classifiers have certain disadvantages. Typically, a set of contexts are identified as a kind of "context vocabulary", in which each context is a geometrical arrangement or grouping of two or more visual words in an image. In some existing techniques, training images are analyzed to cluster contexts of words to define the context vocabulary, and the image classification entails identifying such clustered contexts in the image being classified. This approach works relatively well for well-structured objects such as bicycles, persons, and so forth. However, it does not work as well for more diffuse image components such as beach scenes, backgrounds, and so forth, because there is no single representative "context word" that well-represents such diffuse components.

Moreover, accounting for context in image classification is typically computationally intense. In a typical bag-of-words visual classification scheme, the number of words may number in the hundreds or thousands, and the image is analyzed respective to these hundreds or thousands of visual words. Incorporating context typically increases computational complexity in a multiplicative manner—for example, if the dictionary contains N words, then the total number of potential two-word contexts is N×N, and grows approximately exponentially for contexts of more words.

CROSS REFERENCE TO RELATED PATENTS AND APPLICATIONS

Each of the following co-pending applications are commonly owned with the present application. Each of the following co-pending applications relates at least to techniques for classifying images based on class visual vocabularies.

Florent Perronnin, "Generic Visual Classification With Gradient Components-Based Dimensionality Enhancement", U.S. patent application Ser. No. 11/418,949 filed May 5, 2006 is incorporated herein by reference in its entirety.

Florent Perronnin, "Generic Visual Categorization Method and System", U.S. patent application Ser. No. 11/170,496 filed Jun. 30, 2005 is incorporated herein by reference in its entirety.

BRIEF DESCRIPTION

Example apparatus and method embodiments are illustrated.

In an example method embodiment, a category context model is generated for each of a plurality of image categories including sums of soft co-occurrences of pairs of visual words in geometric proximity to each other in training images assigned to the category. Context information about an image to be classified is generated including sums of soft co-occurrences of pairs of visual words in geometric proximity to each other in the image to be classified. An image category is assigned to the image to be classified based at least on closeness of the context information about the image to the category context models.

In an example apparatus embodiment, a vocabulary of visual words is provided. A patch context analyzer configured to generate a context representation for each of a plurality of patches of an image. Each context representation is indicative of occurrence probabilities of context words in neighboring patches. An image labeler is configured to assign an image category to an image based at least on the context representations of a plurality of patches of the image.

In another example apparatus embodiment, image classifier includes a patch context analyzer configured to generate a context representation for each of a plurality of patches of an image, and an image labeler including a plurality of comparators each comparing (i) closeness of context representations of a plurality of patches of an image with a category context model and (ii) closeness of the context representations of the plurality of patches of the image with a universal context model. The image labeler is configured to assign an image category to the image based on the outputs of the comparators.

In another example method embodiment, an image classification method includes: generating a context representation for each of a plurality of patches of an image based at least on occupancy probabilities of context words in neighboring patches; for each of a plurality of categories, generating a comparison of (i) closeness of the context representations of the image with a category context model representative of the category and (ii) closeness of the context representations of the image with a universal context model representative of all categories; and assigning an image category to the image based on the generated comparisons.

DETAILED DESCRIPTION

Figure 1:
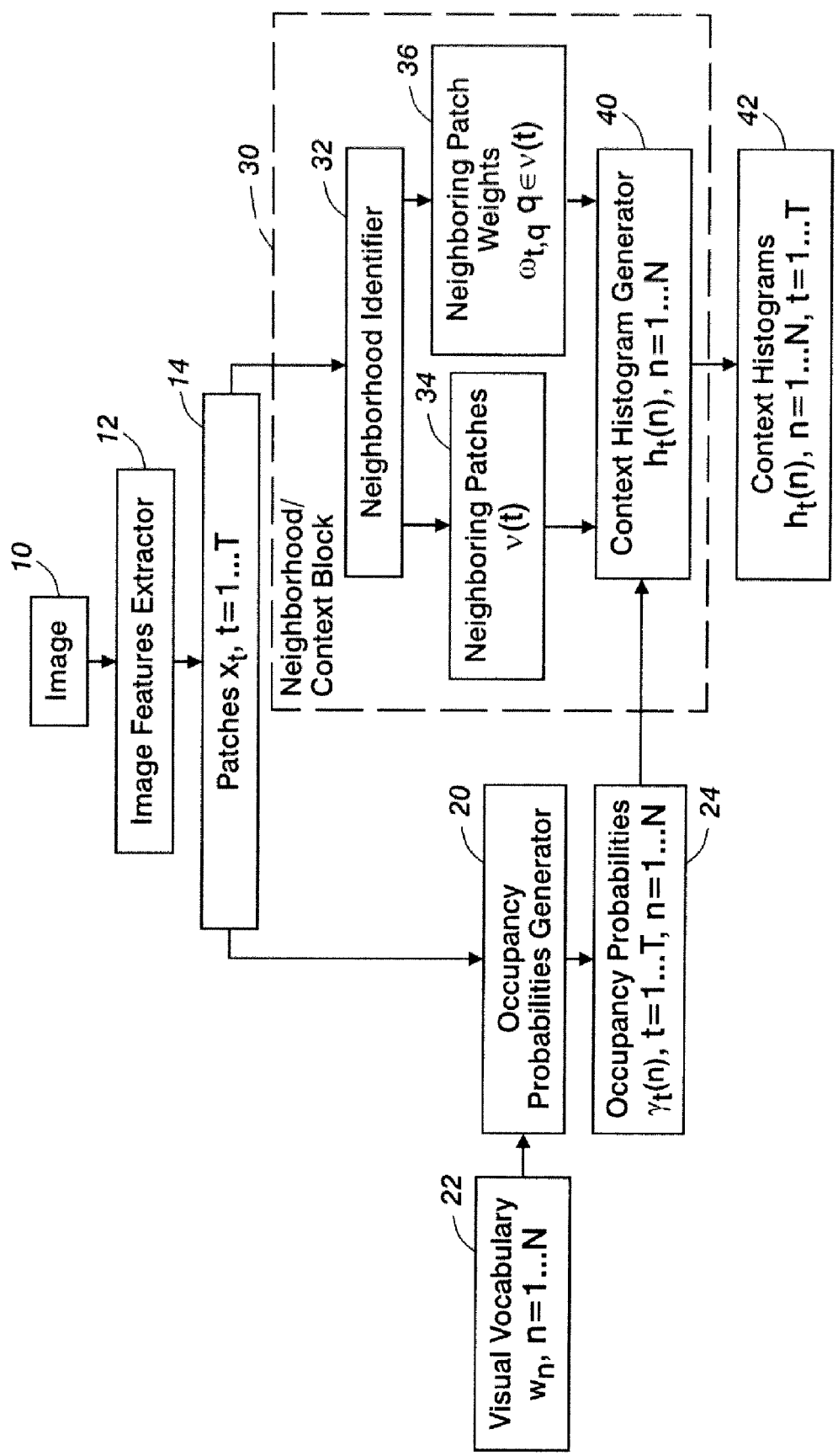
FIG. 1 diagrammatically shows an apparatus for generating context histograms for patches of an image.

With reference to FIG. 1, an image 10 is processed by an image features extractor 12 to generate a plurality of patches 14 each characterized by a vector $x_t$ of low level features. The index t denotes a patch, and there are T patches, so that the index t runs from 1 to T. In one approach, the image features extractor 12 scales the image to a uniform size, such as 100,000 pixels, and defines an array of circular patches of various sizes on a grid. For example, in one approach 500-600 patches are defined at five different scales having radii incrementing by $\sqrt{2}$. In other embodiments, oval, square, or other non-circular patches are defined. Moreover, the patches are optionally arranged randomly or in another non-grid fashion, and may be preferentially grouped in a region of interest of the image 10.

The patches are analyzed by an occupancy probabilities generator 20 to identify occurrences of visual words of a visual vocabulary 22. The visual vocabulary 22 can be generated in various ways, such as by clustering low-level features extracted from training images, using for instance K-means. In another approach for generating the visual vocabulary 22, a probabilistic framework can be used along with an assumed generative model such as a Gaussian Mixture Model (GMM). In this case, the visual vocabulary 22 is suitably estimated using an Expectation-Maximization (EM) algorithm. The occupancy probability $\gamma_t(n)$ of a word $w_n$ in a patch $x_t$ is suitably denoted as $\gamma_t(n)=p(w_n|x_t)$ and is suitably computed using Bayes formula:

$$\gamma_t(n) = \frac{p(x_t|w_n)p(w_n)}{\sum_{m=1}^{N} p(x_t|w_m)p(w_m)}, \quad (1)$$

where N is the number of words in the visual vocabulary 22, $w_n$ denotes the nth visual word (n=1 ... N), $p(w_n)$ and $p(w_m)$ are mixture weights and the $p(x_t|w_n)$ and $p(x_t|w_m)$ are Gaussian components which are characterized by their mean vectors and covariance matrices. The output of the occupancy probabilities generator 20 are occupancy probabilities $\gamma_t(n)$ 24 for patches indexed t=1 ... T and words indexed n=1 ... N. The occupancy probability specifies occurrences of words in the patches 14 in a probabilistic fashion.

With continuing reference to FIG. 1, a neighborhood/context block 30 defines components for identifying a neighborhood of patches around a given patch $x_t$, and generating context information from that neighborhood. A neighborhood identifier 32 identifies, for each patch $x_t$, a set $v(t)$ 34 of other patches $x_q \in v(t)$ that are in the neighborhood of the patch $x_t$. The neighborhood identifier 32 further identifies weights $\omega_{t,q}$ 36 for each neighboring patch $x_q$ indicating proximity or closeness of the patch $x_q$ and the patch $x_t$. For generality, it is useful to measure closeness of two patches based on two criteria: (i) distance between the centers of the two patches; and (ii) similarity of sizes or scales of the two patches. In one suitable approach for measuring closeness of two patches that are circular patches having centers $(x_i, y_i)$ and $(x_j, y_j)$ and radii $\sigma_i, \sigma_j$, the patches are considered as Gaussian distributions $p_i=N(\mu_i,\Sigma_i)$ and $p_j=N(\mu_j,\Sigma_j)$, respectively, with $\mu_i=(x_i, y_i)$, $\mu_j=(x_j, y_j)$, $\Sigma_i=(\lambda\sigma_i)^2 I_2$, and $\Sigma_j=(\lambda\sigma_j)^2 I_2$, where $I_2$ is the 2×2 identity matrix and $\lambda$ is a parameter controlling the spread of the Gaussian distributions. The closeness is determined, for example using the Bhattacharya measure defined as $d(p_i,p_j)=\int (p_i p_j)^{0.5}$. If $p_i$ and $p_j$ are D-dimensional Gaussians, then the measure of similarity is:

$$d(p_i, p_j) = \frac{2^{D/2}|\Sigma_i|^{1/4}|\Sigma_j|^{1/4}}{|\Sigma_i+\Sigma_j|^{1/2}} \exp\left[-\frac{1}{8}(\mu_i-\mu_j)'\left(\frac{\Sigma_i+\Sigma_j}{2}\right)^{-1}(\mu_i-\mu_j)\right]. \quad (2)$$

This measure of similarity is close to its maximum value of unity if $\|\mu_i-\mu_j\|$ is small (that is, the centers are close together) and $\Sigma_i \approx \Sigma_j$ (that is, the two patches have similar size or radii). Note that this measure of similarity can be straightforwardly extended to ellipsoid patches by considering non-isotropic covariance matrices. The neighborhood of a given patch can be defined as those other patches whose geometrical similarity is greater than a predefined threshold $\theta$. Hence, the neighborhood $v(t)$ 34 is defined by the two parameters $\lambda$ and $\theta$. The computation of neighborhoods of all patches in an image involves computation of the Bhattacharya measure (Equation (2)) of similarity between all pairs of patches. The computation time for this is negligible when compared to the computational cost of other processing steps. The computation can be avoided by, for example, using a pre-calculated look-up table in the case of a regular grid of patches.

In some embodiments the neighborhood identifier 32 uses a simpler approach, such as defining the neighborhood as pre-selected patches at pre-selected positions respective to the patch $x_t$ whose neighborhood is being identified. For example, in a rectangular grid of patches, the closest four patches of same size positioned above, below, to the left, and to the right of the patch $x_t$ whose neighborhood is being identified may be used as the neighborhood. While the neighborhood of Equation (2) is rotationally invariant, a neighborhood defined by the upper, lower, left, and right closest patches is not rotationally invariant. Either rotationally variant or rotationally invariant neighborhoods can be used.

The neighborhood identifier 32 operates to identify a neighborhood for each patch $x_t$. A context histogram generator 40 generates context information for each patch $x_t$ based on the word content of the neighboring patches $x_q$ in the neighborhood $v(t)$. In some embodiments, this context information is suitably represented as a context histogram 42 for each patch $x_t$. Each element of the context histogram 42 indicates a statistical occupancy probability of a corresponding context word in neighboring patches $x_q$ in the neighborhood $v(t)$ weighted by closeness of the neighboring patches $x_q$ to the patch $x_t$ for which the context histogram 42 is generated. Defining the Bhattacharya distance (Equation (2)) between patches $x_t$ and $x_q$ as $b_{t,q}$, a weight $\omega_{t,q}$ of the neighboring patch $x_q$ in the neighborhood $v(t)$ 34 of patch $x_t$ is suitably defined as:

$$\omega_{t,q} = \frac{b_{t,q}}{\sum_{q \in v(t)} b_{t,q}}. \quad (3)$$

The context of $x_t$ can then be defined by the context histogram 42 having elements $h_t(n)$ where $n=1 \ldots N$ indexes the context words used in defining the context. The context histogram 42 is suitably given by:

$$h_t(n) = \sum_{q \in v(t)} \omega_q \gamma_q(n). \quad (4)$$

As $\Sigma_{n=1}^{N} h(n) = 1$, the context histogram $h_t(n)$ 42 is the sample occurrence probability of each visual word in the neighborhood of $x_t$. If the choice of neighborhood is scale and rotationally invariant, then the context histograms 42 are also scale and rotation invariant.

Several measures can optionally be taken to increase the computational speed. First, by suitable selection of the parameters $\lambda$ and $\theta$, the neighborhood can be made relatively small, such as having around 5-10 neighboring patches for each patch $x_t$. Additionally, the context words can be a sub-set of the vocabulary 22. For example, the values of the context words can be limited to those vocabulary words $w_n$ for which $\gamma_q(n)$ is above a selected threshold value. Even with a relatively large vocabulary 22, such as N~1000-2000 visual words, for each patch, only a small number K of vocabulary words usually have a substantial $\gamma_q(n)$ value. In some embodiments, the number K is fixed, for example at K=5. As a neighborhood $v(t)$ 34 contains a small number P of patches (typically, P varies between 5 and 10 patches), the context histograms 42 have a maximum of K×P non-zero values. Since K×P is typically significantly smaller than the number of visual words N, the context histograms 42 are sparse. In some embodiments, the number of context words is fixed, for example at 20, and the 20 vocabulary words having the largest $\gamma_q(n)$ values in the neighborhood $v(t)$ 34 are taken as the context words.

Figure 2:
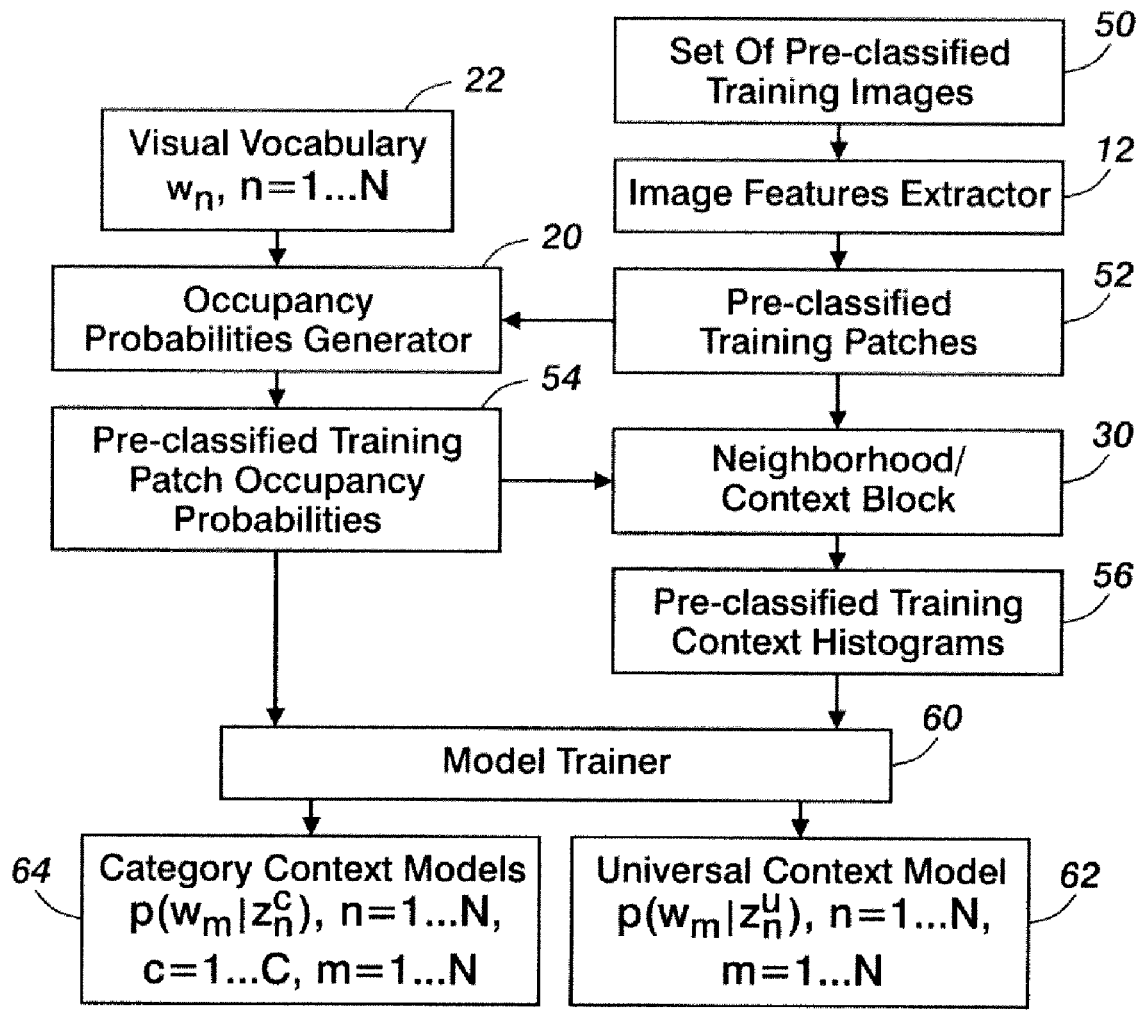
FIG. 2 diagrammatically shows an apparatus for generating a category context model for each of a plurality of categories and a universal context model based on a set of pre-classified training images.

With continuing reference to FIG. 1 and with further reference to FIG. 2, the context information derived from the image 10, such as the context histograms 42, are used in classifying the image 10. In some approaches, this classification is done by comparison of the context information with category models. FIG. 2 diagrammatically shows one approach for deriving category models as well as a universal model from a set of pre-classified training images 50 that are initially processed in the same way as that of the image 10 to be classified. That is, the pre-classified training images 50 are processed by the image features extractor 12 to generate pre-classified training patches 52, the occupancy probabilities generator 20 processes the pre-classified training patches 52 to generate pre-classified training patch occupancy probabilities 54, and the pre-classified training patches 52 are processed in conjunction with the pre-classified training patch occupancy probabilities 54 to generate pre-classified training context histograms 56.

A model trainer 60 trains a context-based model or models based on the pre-classified training context histograms 56 such that the models are predictive of a category of an image. The goal is to model different classes of contexts for each visual word to add discriminative information. In some contemplated embodiments, an automatic model definition of different categories of contexts could be done through clustering. As the context is represented by the pre-classified training context histograms 56, a probabilistic latent semantic analysis (PLSA) framework described for example in R. Hofmann, "Unsupervised learning by probabilistic latent semantic analysis," Machine Learning, 42, pp. 177-96 (2001), is suitable, where contexts correspond to documents and categories of contexts correspond to aspects. Categories of contexts are suitably learned in an unsupervised manner through expectation-maximization (EM). However, this approach does not guarantee that the obtained aspects contain discriminative information to distinguish between categories, and additionally the computational cost of this approach is relatively high, because the optimization is a C-class problem, where C is the number of categories.

Accordingly, in the approach described herein the C class problem is transformed into C two-class problems, which is more computationally tractable. The models include a context model for each category, and a universal model for comparison to each category. Thus, there are C two-class problems, where each two-class problem involves generating a comparison of: (i) closeness of the context information about the image with the corresponding category context model; and (ii) closeness of the context information about the image with the universal context model. For each visual word $w_n$ of interest, C+1 context models are trained, namely one context model per category which describes the distribution of words in the neighborhood of the word $w_n$ in the images of the category under consideration (yielding C context models corresponding to the C categories), and one universal context model which describes the distribution of words in the neighborhood of the word $w_n$ in any image. Given these aspects, one can compute for each image C histograms—one per category—where each histogram describes whether the patch contexts in the image are best described by the universal category context model or the corresponding category context model. The assumption is that if an image belongs to a category c, then it should be best described by the context model of category c rather than by the universal context model. If, on the other hand, an image does not belong to category c, then it should be best described by the universal context model than by the context model of category c. The histogram for each class used in performing the corresponding two-class analysis is called a bi-partite histogram herein and is of size 2N, with one half of the histogram summarizing relevance with respect to the universal context model and the other half summarizing relevance with respect to the category context model.

Training of the universal context model is considered first. Because of the large number of parameters to estimate (N per word which makes a total of $N^2$ parameters), a maximum a posteriori (MAP) criterion is suitably used. A maximum likelihood (ML) criterion could also be used, but the MAP criterion has an advantage in that it provides some smoothing of the parameters. In describing the estimation of the universal context model, the following parameters are used: T denotes the number of training patches 52; $\{x_t, t=1 \ldots T\}$ denotes the training patches 52; $\{h_t, t=1 \ldots T\}$ denotes the corresponding context histograms 56; $\gamma_t(n)$ denotes the occupancy probabilities 54; $T_n = \Sigma_{t=1}^{T} \gamma_t(n)$ denotes the number of soft word occurrences $w_n$ in the whole training set; and $z_n^u$ denotes the parameters of the universal model describing the histogram context observed in the vicinity of word $w_n$ in any image. The term $p(w_m|z_n^u)$ is therefore the probability of observing context word $w_m$ in the neighborhood of the word $w_n$ in any image. The MAP estimate of $p(w_m|z_n^u)$ is suitably given by:

$$\hat{p}(w_m \mid z_n^u) = \frac{\sum_{t=1}^{T} \gamma_t(n) h_t(m) + \tau}{T_n + N\tau}, \quad (5)$$

where $\tau$ is a smoothing factor (setting $\tau=0$ leads to the ML solution). The output of Equation (5) corresponds to the universal context model 62.

Training of each category context model is considered next. Let c denote the category under consideration. The following parameters are introduced: $\delta_t^c=1$ if $x_t$ is extracted from an image which belongs to class c, $\delta_t^c=0$ otherwise; $T_n^c = \Sigma_{t=1}^{T} \delta_t^c \gamma_t(n)$ is the number of soft occurrences of the word $w_n$ in the training images of category c; and $z_n^c$ denotes the parameters of the category model describing the histogram context observed in the vicinity of word $w_n$ in the images of category c. Using these definitions, it follows that $p(w_m|z_n^c)$ is the probability of observing context word $w_m$ in the neighborhood of the word $w_n$ in the images of category c.

Using a MAP estimate analogous to that of Equation (5) for the category context models is expected to have certain problems if there is data scarcity for training of at least some category context models. If $p(.|z_n^u)$ and $p(.|z_n^c)$ are similar distributions (that is, if the context of word $w_n$ does not help distinguishing class c from the other classes), then the estimates $\hat{p}(.|z_n^u)$ and $\hat{p}(.|z_n^c)$ should be similar. However, since there is substantially less data for estimating the category aspects as compared with the universal aspects (typically about C times less data), it follows that $\hat{p}(.|z_n^c)$ will be smoother than $\hat{p}(.|z_n^u)$, which is undesirable. On the other hand, if the condition $\tau'=\tau/C$ is set so as to avoid this, then the estimate $\hat{p}(.|z_n^c)$ will typically not be sufficiently robust.

Accordingly, in the embodiments described herein a modified version of the MAP re-estimation formula is used to adapt the category aspects from the universal ones. If limited training data is available for the estimation of $p(.|z_n^c)$ (that is, if the number of training samples $T_n^c$ is small with respect to the number of parameters N to estimated), then the term $\hat{p}(.|z_n^c)$ should be close to the term $\hat{p}(.|z_n^u)$. If, on the other hand, training data is plentiful, it is advantageous for $\hat{p}(.|z_n^c)$ to be close to the ML estimate. Thus, the following formula estimate is applied herein:

$$\hat{p}(w_m \mid z_n^c) = \alpha_n^c \times \frac{\sum_{t=1}^{T} \delta_t^c \gamma_t(n) h_t(m)}{T_n^c} + (1 - \alpha_n^c) \times \hat{p}(w_m \mid z_n^u), \quad (6)$$

with $$\alpha_n^c = \frac{T_n^c}{T_n^c + \tau N}, \quad (7)$$

which leads to:

$$\hat{p}(w_m \mid z_n^c) = \frac{\sum_{t=1}^{T} \delta_t^c \gamma_t(n) h_t(m) + \tau N \hat{p}(w_m \mid z_n^u)}{T_n^c + N\tau}. \quad (8)$$

Training of the category context models thus reduces to counting of soft co-occurrences and can therefore be achieved efficiently to produce the category context models 64.

Figure 3A:
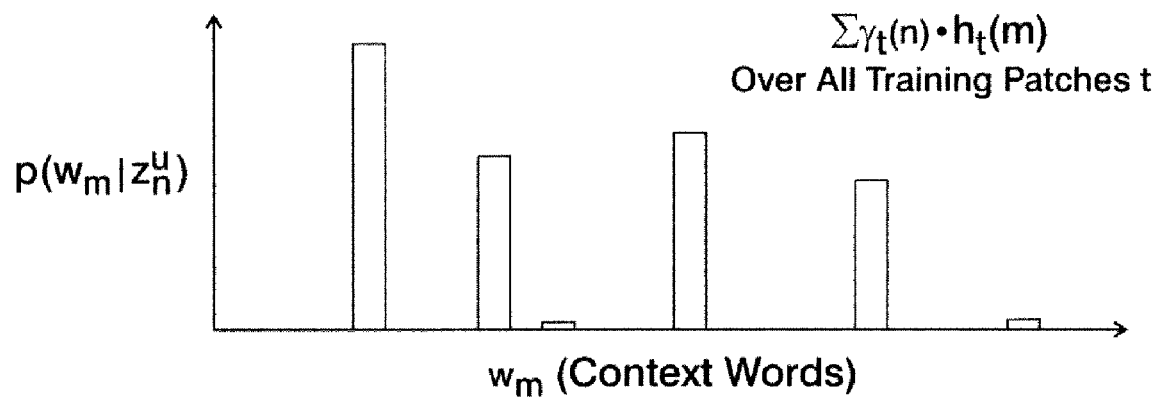
FIGS. 3A and 3B diagrammatically shows generation of an example universal context model and an example category context model, respectively.
Figure 3B:
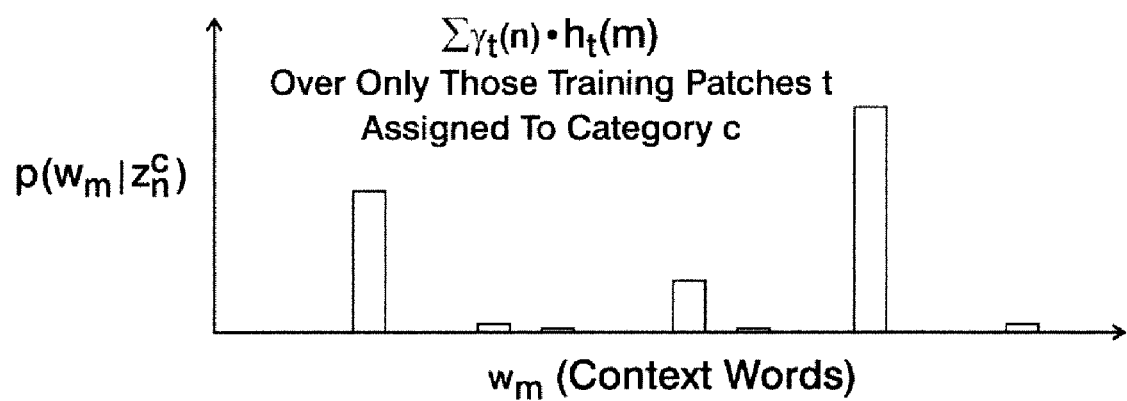

With reference to FIGS. 3A and 3B, the training process is illustrated diagrammatically. The definition of $z_n^u$ amounts to counting soft co-occurrences of context words $w_m$ in the vicinity of a word $w_n$ for a patch t, also summed over the patches t=1 . . . T, in accordance with Equation (5). The definition of $z_n^c$ for a given category c similarly amounts to counting soft co-occurrences of context words $w_m$ in the vicinity of a word $w_n$ for a patch t, also summed over that sub-set of the patches t=1 . . . T that are pre-classified as belonging to class c, in accordance with Equation (8). By the term "soft" it is meant that the counting is weighted by the occupancy factors $\gamma_t(n)$ of the word $w_n$ in the patch under consideration and (through the context histogram 42 of Equation (4)) by the occupancy factors $\gamma_q(m)$ of the neighboring context word $w_m$. The context words $W_m$ may be all words in the visual vocabulary 22; however, this approach is computationally intensive, and typically results in large number of histogram elements that are close to zero. Accordingly, in some embodiments the context words are limited to a fixed number M words that have highest occupancy probability in the neighborhood of a given patch t. A value of M=20 is typically sufficient.

In some embodiments, it is contemplated for the context words to include at least some derived words that are not included in the vocabulary 22 of visual words but that are derived from visual words of the vocabulary 22. For example, the vocabulary 22 may include a number of visual words indicative of various forms of a round object, such as visual words for the sun, for a soccer ball, for a tire, and so forth. These visual words may optionally be combined to define a broader context word for a round object in general. The use of such generalized context words is expected to increase the number of co-occurrences and provide less sparse data for category context modeling.

Figure 4:
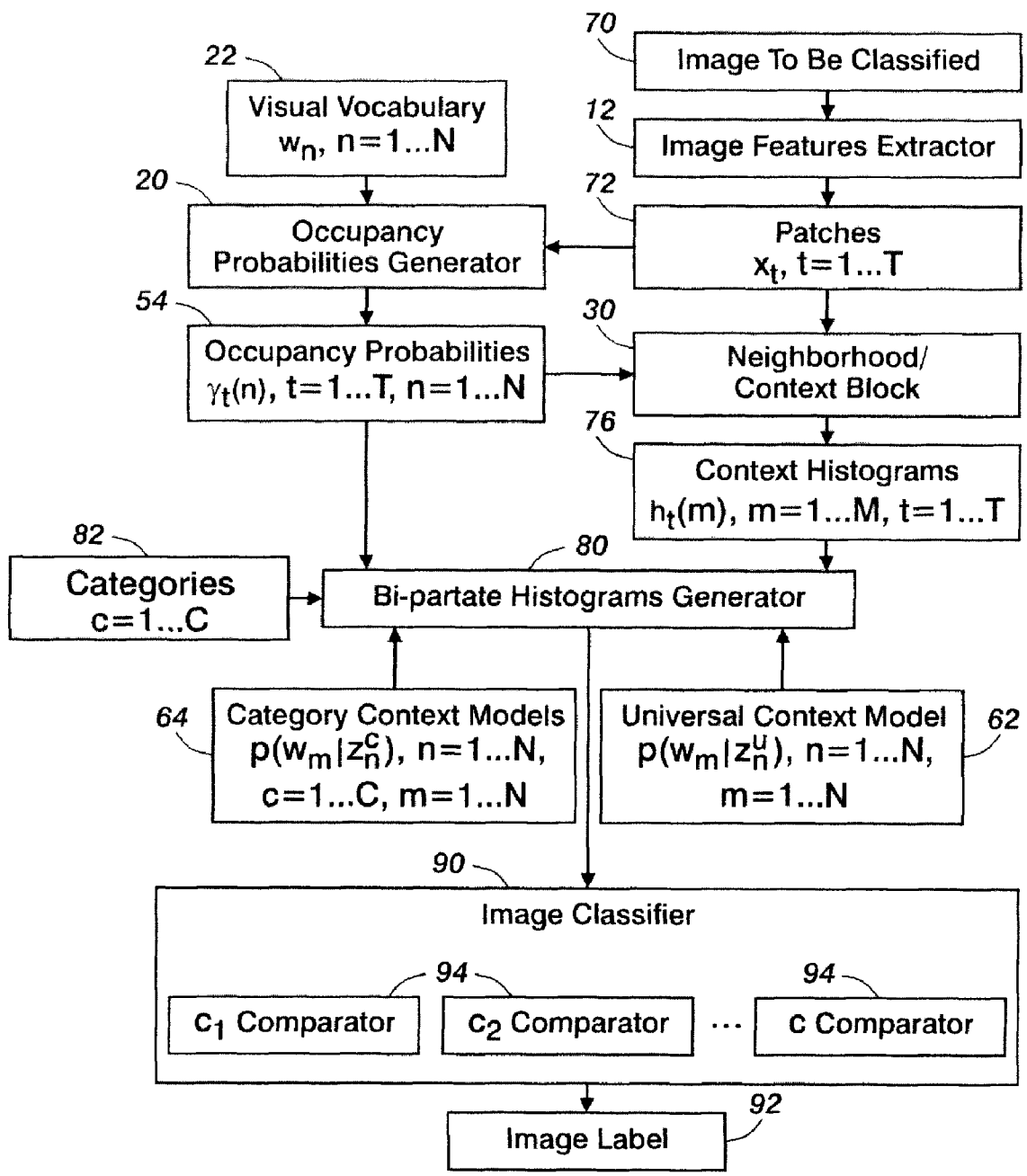
FIG. 4 diagrammatically shows an image labeler that assigns an image category to an image to be classified based on comparison of context information derived from the image to be classified and the category and universal context models generated by the apparatus of FIG. 2.

With reference to FIG. 4, an image to be classified 70 is assigned an image category based on closeness of the context information about the image to be classified to the category context models 64 each compared with closeness of the context information about the image to the universal context model 62. This corresponds to C two-class problems. The image to be classified 70 is processed by the image features extractor 12 to generate a set of patches 72 denoted by t where t=1 . . . T with corresponding low level feature vectors $x_t$. The occupancy probabilities generator 20 computes for each of the words $w_n$, n=1 . . . N of the vocabulary 22 and for each patch $x_t$ an occupancy probability to generate the occupancy probabilities 74 denoted $\gamma_t(n)$, t=1 . . . T, n=1 . . . N. The neighborhood/context block 30 is then applied to generate context information about the image to be classified 70 in the form of context histograms 76 denoted $h_t(m)$, m=1 . . . M, t=1 . . . T.

For each visual word $w_n$ and for each category c, the universal and category model aspects $z_n^u$, $z_n^c$ are made to compete to explain the context information 76 as a two-class problem. This is done utilizing a bi-partite histograms generator 80 that generates a bi-partite histogram for each visual word in the vocabulary 22 (or optionally for a sub-set of these words such as for each visual word having sufficiently high occupancy probability in the image to be classified) and for each class 82, where the classes 82 run from c=1 to c=C. Computation of the bi-partite histograms suitably involves estimating $\hat{p}(z_n^u|h_t)$ and $\hat{p}(z_n^c|h_t)$ iteratively (with $\hat{p}(z_n^u|h_t)+\hat{p}(z_n^c|h_t)=1$) using the PLSA equations:

$$\hat{p}(z_n^u|h_t,w_m) = \frac{p(w_m|z_n^u)p(z_n^u|h_t)}{p(w_m|z_n^u)p(z_n^u|h_t)+p(w_m|z_n^c)p(z_n^c|h_t)}, \quad (9)$$

$$\hat{p}(z_n^c|h_t,w_m) = \frac{p(w_m|z_n^c)p(z_n^c|h_t)}{p(w_m|z_n^u)p(z_n^u|h_t)+p(w_m|z_n^c)p(z_n^c|h_t)}, \quad (10)$$

$$\hat{p}(z_n^u|h_t) = \sum_{m=1}^{M} h_t(m)\hat{p}(z_n^u|h_t,w_m), \quad (11)$$

and $$\hat{p}(z_n^c|h_t) = \sum_{m=1}^{M} h_t(m)\hat{p}(z_n^c|h_t,w_m). \quad (12)$$

To generate the bi-partite histogram, the category aspect values $\gamma_t(n)\hat{p}(z_n^c|h_t)$ are suitably accumulated in bin n, while the universal aspect values $\gamma_y(n)\hat{p}(z_n^u|h_t)$ are suitably accumulated in bin N+n. This results in C bi-partite histograms each of size 2N.

A substantial advantage of defining visual word context models on a per-word basis as disclosed herein is the reasonable additional computational cost. If all words in the vocabulary 22 are used for context words and for patch words, then the number of parameters is (N×N) (C+1) which is feasible (though less than ideal) for typical vocabularies of N~1000-2000 words. Computational cost can be reduced by taking into account the expectation that, for a given patch $x_t$, only a few words $w_n$ have a non-negligible occupancy probability $\gamma_t(n)$. Thus, in some embodiments each patch is characterized by only K words having the highest occupancy probability for that patch. For example, in some such embodiments, K=5 is suitable to provide sufficient context information at reasonable computational cost. The values $\gamma_t(n)\hat{p}(z_n^c|h_t)$ and $\gamma_t(n)\hat{p}(z_n^u|h_t)$—and consequently, the values $\hat{p}(z_n^c|h_t)$ and $\hat{p}(z_n^u|h_t)$—are suitably only computed for these K words. This makes the computational cost of this approach in these embodiments independent of the vocabulary size and the larger the vocabulary size, the smaller the additional computational cost.

The generated bi-partite histograms are input to an image classifier 90 that assigns an image category 92 to the image. The classification of the bi-partite histograms can be done using any type of classifier. In some embodiments, a logistic regression with a Laplacian prior is applied, which induces sparseness. In some embodiments, a comparator 94 is trained in a "one-versus-all" manner per class. Thus, there are C comparators where c=1 . . . C. The comparator for category c is trained with the bi-partite histograms for category c. The image classifier 90 assigns the image category 92 based on the output of the comparators 94, for example by assigning the category whose corresponding comparator 94 outputs the largest differential between the category fit compared with the universal fit.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An image classification method comprising:
    generating a category context model for each of a plurality of image categories, the category context model for an image category including sums of soft co-occurrences of pairs of visual words in geometric proximity to each other in training images assigned to the category;
    generating context information about an image to be classified, the context information including sums of soft co-occurrences of pairs of visual words in geometric proximity to each other in the image to be classified; and
    assigning an image category to the image to be classified based on comparison of the context information about the image with the category context models for the image categories;
    wherein at least the generating of the category context model and the generating of context information are performed by a computing apparatus.

2. The image classification method as set forth in claim 1, further comprising:
    generating a universal context model including sums of soft co-occurrences of pairs of visual words in geometric proximity to each other in training images assigned to any of the plurality of image categories; and
    for each category, generating a comparison of (i) closeness of the context information about the image to be classified with the corresponding category context model and (ii) closeness of the context information about the image to be classified with the universal context model, the assigning of the image category to the image to be classified being based on the comparisons.

3. The image classification method as set forth in claim 1, wherein the soft co-occurrences are computed as products of at least occupation probability values for the visual words of the pair of visual words in neighboring patches of the training image or the image to be classified.

4. An image classifier comprising:
    a vocabulary of visual words wherein a visual word is a defined grouping of low-level image features;
    a patch context analyzer configured to generate a context representation for each of a plurality of patches of an image, wherein the context representation for a patch is based on occurrence probabilities of context visual words in a plurality of neighboring patches;
    an image labeler configured to assign an image category to an image based at least on the context representations of a plurality of patches of the image, wherein the image labeler applies a category context model for each image category that indicates probabilities of context words being in a neighborhood of an occurrence of a vocabulary word for images of that image category; and
    a category context model generator configured to generate each category context model as sums of soft co-occurrences of pairs of words in geometric proximity to each other in training images assigned to the category.

5. The image classifier as set forth in claim 4, wherein the context words consist of a sub-set of visual words of the vocabulary that is substantially smaller than the total number of words in the vocabulary.

6. The image classifier as set forth in claim 4, wherein the context words include all visual words of the vocabulary.

7. The image classifier as set forth in claim 4, wherein the context words include at least some derived words that are not included in the vocabulary of visual words but that are derived from visual words of the vocabulary.

8. The image classifier as set forth in claim 4, wherein the patch context analyzer generates the context representation for each patch as a plurality of values, each value being indicative of a statistical occupancy probability of a corresponding context word in neighboring patches weighted by closeness of the neighboring patches to the patch for which the context histogram is generated.

9. An image classifier comprising:
a vocabulary of visual words wherein a visual word is a defined grouping of low-level image features;
   a patch context analyzer configured to generate a context representation for each of a plurality of patches of an image, wherein the context representation for a patch is based on occurrence probabilities of context visual words in a plurality of neighboring patches;
   an image labeler configured to assign an image category to an image based at least on the context representations of a plurality of patches of the image, wherein the image labeler applies (i) a category context model for each image category that indicates probabilities of context words being in a neighborhood of an occurrence of a vocabulary word for images of that image category and (ii) a universal context model that indicates probabilities of context words being in a neighborhood of an occurrence of a vocabulary word for images regardless of image category;
   a category context model generator configured to generate each category context model as sums of soft co-occurrences of pairs of words in geometric proximity to each other in training images assigned to the category; and
   a universal context model generator configured to generate the universal context model as sums of soft co-occurrences of pairs of words in geometric proximity to each other in training images assigned to all categories.

10. The image classifier as set forth in claim 4, wherein the image labeler includes a plurality of comparators each comparing (i) closeness of the context representations of the patches of the image with a category context model and (ii) closeness of the context representations of the patches of the image with a universal context model, the image category being assigned based on the outputs of the comparators.

11. The image classifier as set forth in claim 9, wherein the context words consist of a sub-set of visual words of the vocabulary that is substantially smaller than the total number of words in the vocabulary.

12. The image classifier as set forth in claim 9, wherein the context words include all visual words of the vocabulary.

13. The image classifier as set forth in claim 9, wherein the context words include at least some derived words that are not included in the vocabulary of visual words but that are derived from visual words of the vocabulary.

14. The image classifier as set forth in claim 9, wherein the patch context analyzer generates the context representation for each patch as a plurality of values, each value being indicative of a statistical occupancy probability of a corresponding context word in neighboring patches weighted by closeness of the neighboring patches to the patch for which the context histogram is generated.

15. The image classifier as set forth in claim 9, wherein the image labeler includes a plurality of comparators each comparing (i) closeness of the context representations of the patches of the image with a category context model and (ii) closeness of the context representations of the patches of the image with a universal context model, the image category being assigned based on the outputs of the comparators.

\* \* \* \* \*